United States Patent [19]
Sanders

[11] 3,920,554
[45] Nov. 18, 1975

[54] SCAVENGER FILTER

[76] Inventor: Peter K. Sanders, 1100 Ingelside Ave., McLean, Va. 22101

[22] Filed: July 25, 1974

[21] Appl. No.: 491,757

[52] U.S. Cl. ......... 210/247; 210/DIG. 21; 210/458; 210/476
[51] Int. Cl.² ......................................... B01D 27/08
[58] Field of Search ... 210/23, 40, DIG. 5, DIG. 21, 210/242, 247, 248, 473, 474, 476, 457, 458

[56] References Cited
UNITED STATES PATENTS

| 406,126 | 7/1889 | Curran | 210/474 |
|---|---|---|---|
| 1,748,654 | 2/1930 | Palmer et al. | 210/474 X |
| 1,767,915 | 6/1930 | Bugg | 210/473 X |
| 1,959,623 | 5/1934 | Gordon | 210/247 |
| 3,627,677 | 12/1971 | Dyrud | 210/23 |
| 3,756,948 | 9/1973 | Weinberg | 210/DIG. 21 |
| 3,779,908 | 12/1973 | Gregory | 210/23 |
| 3,785,970 | 1/1974 | Hodgkins | 210/DIG. 5 |
| 3,794,583 | 2/1974 | Rhodes | 210/40 |
| 3,800,950 | 4/1974 | Hess et al. | 210/DIG. 21 |

Primary Examiner—Theodore A. Granger
Attorney, Agent, or Firm—Hyman Hurvitz

[57] ABSTRACT

This filter provides a simple and efficient device utilizing a two-stage filtration system configured to insure uniform saturation of the filtration-absorbent material. The filter device is particularly useful in connection with bilges of ships and boats to preclude hydrocarbon contamination of rivers, lakes, and oceans, normally containing oil discharge. The filter may also be used to retrieve hydrocarbon oils in industrial use from water, for re-use; and also to retrieve hydrocarbon oils which are contaminants in waters discharged from industrial activity.

8 Claims, 4 Drawing Figures

SCAVENGER FILTER

The object of the present invention is to provide a simple and efficient filter which operates as a two-stage filtration system designed to insure uniform saturation of the filtration-absorbent material which comprises lightly packed particles of oleophilic, porous filter material which does not settle substantially when used in the filter housings. A preferred filter material is a very special type of foamed polystyrene.

Other objects and advantages of this invention will be apparent from the accompanying drawings and description and the essential features thereof will be set forth in the appended claims.

In the drawings,

FIG. 3 is a central sectional view of the filter shown in FIG. 2; while

It should be understood that the filter of this invention may be made in various sizes depending upon its location, the desired capacity of liquid flow therethrough, and various other factors. The embodiment described herein utilizes housings of about four and a half gallons capacity adapted to handle about five gallons per minute throughput of bilge water from a small boat. The principle may be adapted to other sizes.

Figure 2:
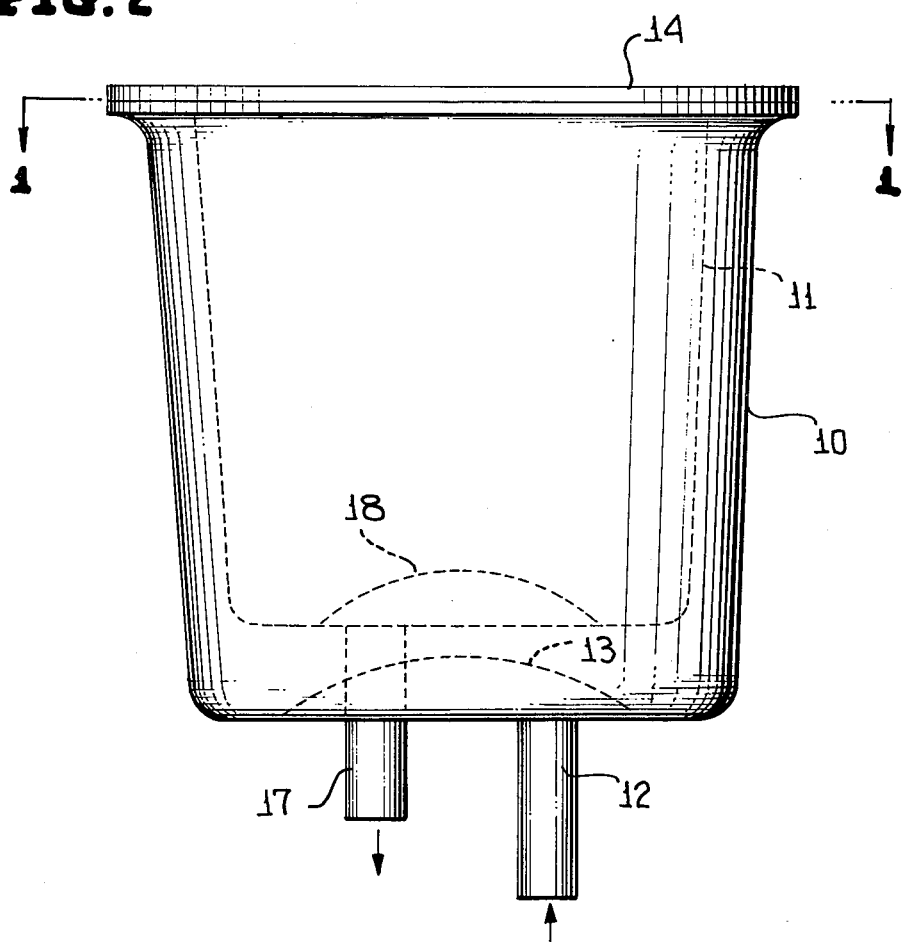
FIG. 2 is a side elevational view of the filter.
Figure 3:
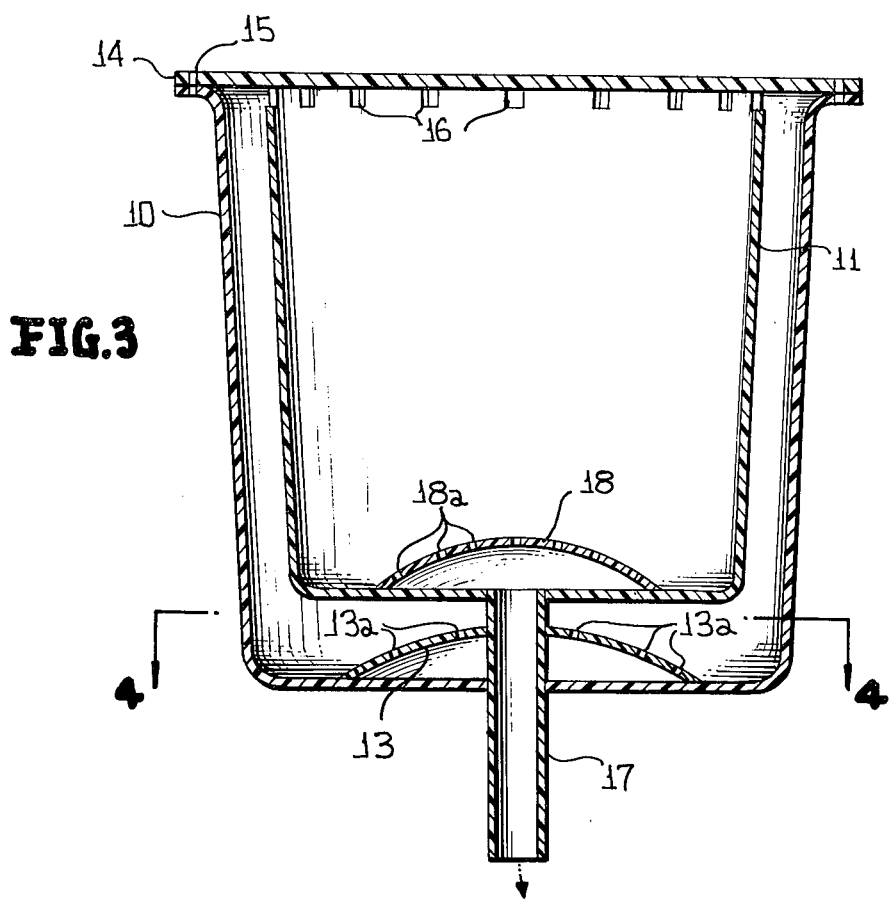
Figure 4:
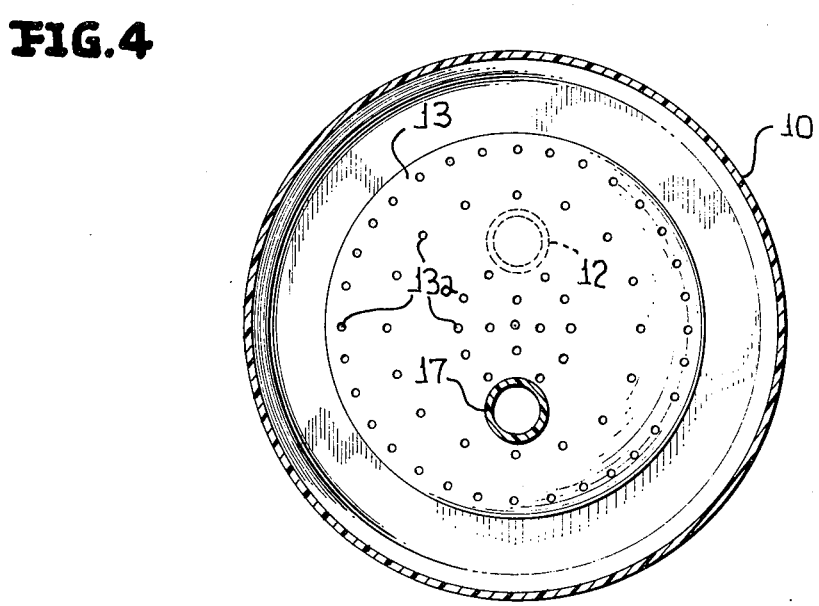
FIG. 4 is a sectional view taken along the line 4—4 of FIG. 3.

Shown in FIGS. 2 and 3 are two cup-shape housings, both open at the top, one being the primary housing 10 and the other being the secondary housing 11. In this described embodiment, the housing 10 is about 12 or 13 inches in diameter at the top and about 12 or 13 inches in height, while the secondary housing 11 is between 9 and 9½ inches at the top and about the same in depth. The drawings show the housings converging slightly downwardly toward the bottom but this is not necessarily so, and each cup could be cylindrical in shape. These housings are made of fiber glass and plastic, or of plsatic coated material to minimize erosion, corrosion of decomposition of the housing and its component parts due to its exposure to environmental conditions and/or to contaminants encountered in the filtration function described.

The primary housing has an inlet tube 12, sealed to its bottom, and in this modification, being around 1 to 1⅛ inches in diameter. Means is provided for diffusing an incoming liquid stream from the inlet means 12 and this comprises a plate 13 upwardly convex and having a plurality of small openings 13a extending therethrough normally in a direction more or less at right angles to the plate 13. The total area of these small openings is substantially equal to the area of the inlet means 12 so as not to restrict the flow of liquid through the filter. In this particular case, there are 62 or 63 of the small openings ⅛ inch in diameter corresponding to an inlet tube 12 of 1 inch to 1⅛ inch diameter. This plate prevents any substantial flow into the filter other than through the small openings 13a.

As seen in FIG. 3, a dirty liquid stream entering at inlet 12 will pass radially outwardly generally parallel to the bottom of the housing 10 and then upwardly in the annular space between the housings 10 and 11. It will be seen that these two housings terminate at substantially the same horizontal level at the top and the filter is there covered with a flat lid 14, which preferably is clear plexiglass, if one wishes to follow the filtration action. Bolts or screws pass through the openings 15 to hold the lid tightly sealed to the housing 10 and substantially touching the top of the housing 11.

Figure 1:
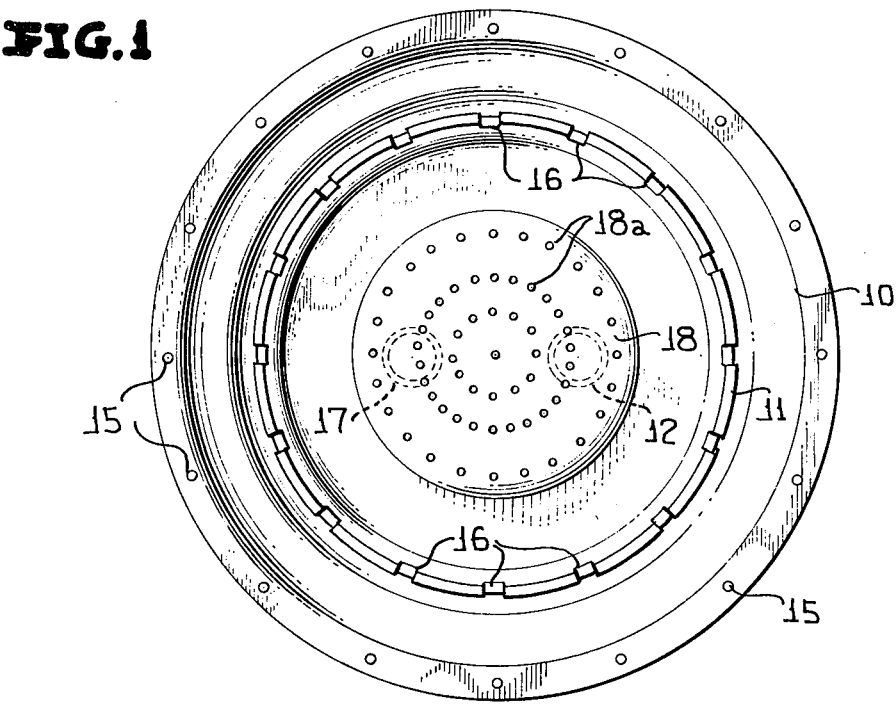
FIG. 1 is a top plan view of the assembled filter taken along the line 1—1 of FIG. 2, that is, with the top cover or lid of the filter removed.

Means is provided where the liquid stream flows inwardly from the annular space of housing 10 to the top of the housing 11 for spreading such stream over substantially the entire top of the secondary housing. In FIG. 3, this consists of a plurality of notches 16 cut into the top of the cup-shape housing 11 and in this modification of the invention being about ⅛ inch square for each notch. With about sixteen of these notches effective, the flow passes radially inwardly through the notches in the form of individual jet streams which carry some of the liquid substantially to the entire surface of the housing 11 as seen in FIG. 1.

The liquid stream then passes downwardly through the housing 11 toward the outlet tube 17. Means is provided closely upstream from this outlet to permit only a diffused flow of liquid from the secondary housing 11 to the outlet 17. This is shown in FIG. 3 as a curved plate 18 through which pass a plurality of small openings 18a which extend substantially at right angles through the plate 18.

The filler material used in the housings 10 and 11 as seen in FIG. 3 comprises lightly packed particles of oleophilic, porous filter material which does not settle substantially when used in said filter housings. Several such materials have worked successfully in this filter.

The filler material preferably utilized in this invention is a foamed polystyrene plastic which is of closed cell type, made by inflating cells of polystyrene with air in the forming process. This results in a non-permeable, multi-cellular mass that contains about 97 percent air by volume. It is only one forty-second as heavy as solid polystyrene and is 30 percent more buoyant than cork. The particular material utilized by this invention starts from an extruded foam which is produced by free expansion of a hot mixture of polystyrene, blowing agents and various additives through a slit orifice. This extrusion method allows variation of density and cell size so that foams can be tailor-made with specific properties. The particular foam used in this invention has a density between about 1.4 and about 2.0 pounds per cubic foot and an average cell size between about 1.0 mm and 3.0 mm, and absorbs about nineteen times its weight of crude oil, has a selective absorption for oil when subjected to a mix of oil plus water, and does not soil upon contact after absorbing a saturated load of crude oil out of a bath of water. I intend by this description to designate only a product sold by Dow Chemical Company under the trademark Styrofoam, D. B. Brand, and designated in the claims as "foamed polystyrene".

The absorbent foam used in this invention is prepared by shredding such an extruded polystyrene board. The shredding is necessary to open up the cells for better oil absorption. The material when shredded might be called crumbs, the acceptable size of which preferred for this invention passes through ¾ inch mesh and is held on ¼ mesh screen. The specific gravity of this shredded dry foam in the form of such crumbs is 0.093.

The absorbent material of this invention is olephilic, that is, it has a selective absorption whereby it shows a preference for the oil rather than for the water. It is also structurally strong enough to hold its form, without substantial settling when used in the filter of this invention.

With the housings 10 and 11 filled with suitable filter material to the top of each of them, the operation is as follows. As the hydrocarbon contaminated liquid enters the unit at the inlet means 12, it enters a domed chamber or cavity, the roof of which is provided by arcuate plate 13 containing between 62 and 75 small holes drilled at various angles to insure equal dispersion and penetration of the surrounding absorbent material by the entering liquid. The size and number of these uniform holes within this dispersion head will vary depending upon the volume flow of the input source. Upon entering the filter chamber in housing 10, outside of the housing 11, the dirty liquid material is exposed to crumbs of the polystyrene foam above described, or other suitable material of a similar character which fills the entire available space in the housing 10. The individual crumbs and their positioning in the housing 10 form an agglomeration of crumbs of multi-cellular mass which further enhances its unit absorption by weight beyond the nineteen times absorption asscribed to the individual crumb components. As the liquid containing the hydrocarbon contaminants is equally distributed and passes through the absorbent material of the filter, this absorbent material becomes saturated and, because of its oleophilic character, filters out the hydrocarbon oils, thus purifying its carrier liquid for re-use or harmless disposal. The carrier liquid, gradually cleansed of the hydrocarbon oil content, flows continuously through stage 1 in the housing 10 and then over the top of the cup housing 11, through the plural notches 16 and is spread fairly evenly over the entire surface of the open cup 11. The liquid then passes downwardly through housing 11 while further hydrocarbon oils are picked up by the filter material. To further insure equal distribution in the housing 11, another domed chamber or arcuate plate 18 is provided covering the central portion of the bottom of the housing 11 and containing approximately the same number of small holes as were provided in the plate 13. This causes fairly equal access of the flowing liquid to each of the small holes 18a, after which it passes to the outlet 17.

A test of the filter described herein showed a discharge of clean liquid at the outlet 17, free of hydrocarbon oils, for a period of 21 minutes. Thereafter, the filter material was completely saturated with hydrocarbon oils and the filter had to be shut down and reloaded with clean absorbent filter material. This test was conducted with water containing about 3 percent of hydrocarbon oils at a flow of 5 gallons per minute. This filter when filled with the preferred Styrofoam D. B. Brand filter material had 3.75 gallons of water. At the end of the test, this same volume had about 3.02 gallons of oil which would indicate about 80 percent absorption.

Thus, the filter of this invention is very efficient for the purpose intended and the same may be designed to take care of any expected hydrocarbon content of the bilge water to be treated.

What is claimed is:

1. A filter comprising an outer primary housing and a secondary housing; said housings being cup-shaped and said secondary housing resting within said primary housing; porous oleophlic filter material substantially filling said inner housings and the space between said housings; inlet means for introducing a liquid stream at the central portion of the bottom of said primary houisnig; means closely downstream from said inlet means for diffusing an incoming liquid stream from said inlet means substantially evenly throughout the available cross-section of said primary housing; means for transferring, without loss, said liquid stream from the top of said primary housing to the top of said secondary housing; said last means including apertures for spreading said stream over substantially the entire top of said secondary housing; an outlet means from said filtered stream located at the bottom of said secondary housing; diffusing means located upstream from said outlet, covering means for closing off said housings, whereby liquid is constrained to proceed through said primary and secondary housings seriatim in proceeding from said inlet means and said outlet means.

2. A filter as defined in claim 1, wherein said means for spreading said stream over the top of said secondary housings comprises a plurality of apertures directing said liquid generally radially inwardly from the top of said primary housing over the top of said secondary housing.

3. A filter as defined in claim 1, wherein said inlet means is a tube, and said means for diffusing an incoming liquid stream from said inlet means comprises a plate upwardly convex having a plurality of small openings extending normally therethrough; the total cross-sectional area of said small openings being substantially equal to the cross-sectional area of said tube; and said plate preventing any substantial flow other than through said small openings.

4. A filter as defined in claim 3, wherein said small openings are each approximately ⅛ inch in diameter.

5. A filter as defined in claim 1, wherein said means permitting only a diffused flow of liquid from said secondary housing to said outlet comprises a plate upwardly convex having a plurality of small openings therethrough; the total area of said small openings being substantially equal to the area of said outlet; and said plate preventing any substantial flow other than through said small openings.

6. A filter as defined in claim 5, wherein said small openings are each approximately one-eighth inch in diameter.

7. A filter as described in claim 1, wherein said filler material is lightly packed particles of oleophilic, porous filter material which does not settle substantially when used in said filter housings.

8. A filter as described in claim 1, wherein said filter material consists of crumbs of foamed polystyrene of normally closed cell-type of which the cells have been opened up by shredding, a multi-cellular mass of such polystyrene having a density between 1.4 and 2.00 pounds per cubic foot, having an average cell size between 1.0 mm, and 3.0 mm, having a selective absorption for oil when subjected to a mix of oil and water, which absorbs about nineteen times its weight of crude oil and said crumbs of a size passing ¾ inch mesh and retained on a ¼ inch mesh screen.

* * * * *